United States Patent Office 3,398,254
Patented Aug. 20, 1968

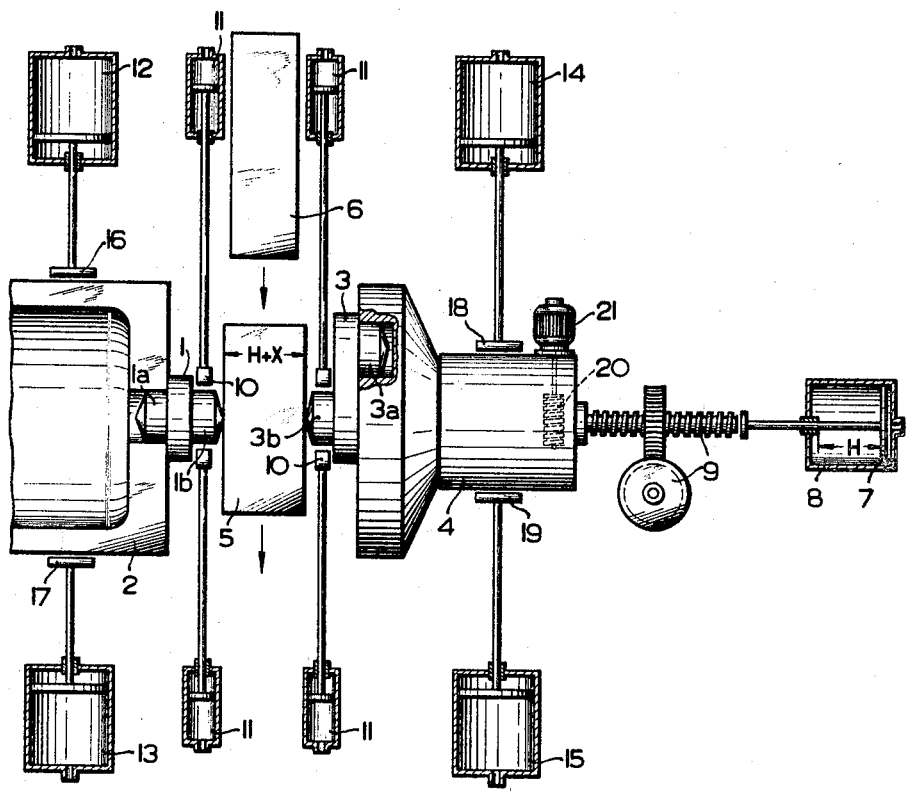

3,398,254
METHOD AND APPARATUS FOR ELECTRIC
RESISTANCE FLASH WELDING
Eberhard Rietsch, Burscheid, Germany, assignor to
Theodor Wuppermann Gesellschaft mit beschrankter Haftung, Leverkusen, Germany
Filed Dec. 30, 1964, Ser. No. 422,223
Claims priority, application Germany, Jan. 10, 1964,
W 35,948
2 Claims. (Cl. 219—97)

ABSTRACT OF THE DISCLOSURE

A method and apparatus for electric resistance flash welding two crankshaft halves. The apparatus includes a quick acting device for moving the workpieces into engagement with each other thru a fixed length stroke. In advance of welding the parts, a gauge is interposed between them. The gauge has a thickness equal to the fixed stroke of the quick acting device plus a value corresponding to the elongation of the parts due to preheating. After the gauge is withdrawn, an induction heater is placed between the parts to preheat them. The heater is then withdrawn and the parts are brought into welding engagement.

Background of the invention

This invention relates to electric welding, and, more particularly, to a novel method of and apparatus for weld uniting crank shaft sections or partial crank shafts by a combination of induction preheating and electric resistance flash welding.

It is common practice to form relatively large dimension crank shafts by weld uniting partial crank shafts or crank shaft sections. Generally, only small quantities of large dimension crank shafts are required, and these may vary in size and shape from one finished crank shaft to another. This, in turn, necessitates the use of special contact jaws each adapted to a particular size and shape of crank shaft. As a result, the economy and efficiency are low because of the high manufacturing cost and the relatively long "down time" of welding machines required for exchanging the contact jaws.

It has been proposed, in view of these difficulties, to separate the mechanical clamping means for the crank shaft sections from the current supply means used during uniting of these sections, and to supply the welding current only to the shaft and/or a crank pin. This has the advantage that the current supply jaws have a relatively simple form and are, as a practical matter, applicable universally to most of the work to be welded.

It has now been found, however, that, in practice, crank shafts of modern design are not adaptable to welding operations of the just mentioned type. This is because these modern design crank shafts have very short axial lengths such that the contact areas available for supplying current through contact jaws engaging the pins or shaft is insufficient for the current density required.

An object of the present invention is to provide a novel method of weld uniting crank shaft sections or partial crank shafts having current contact jaw engaging areas insufficient for the passage of the relatively high welding current densities required for straight electric resistance flash welding.

Another object of the invention is to provide novel apparatus for weld uniting crank shaft sections or partial crank shafts and involving a combination of induction preheating and electric resistance flash welding.

A further object of the invention is to provide a novel method of and apparatus for weld uniting crank shaft sections or partial crank shafts each comprising a crank web and two half pins, and in which the supply of welding current is effected independently of the mechanical clamping of the parts to be weld united.

In accordance with the invention, two crank shaft parts to be welded are positioned in chucks which are relatively movable with respect to each other. Each of these crank shaft parts may comprise, for example, a web having a pair of crank shaft pins extending from respective opposite side surfaces thereof, with the pins to be weld united being coaxially arranged with respect to each other when the parts are positioned in the chucks. A gauge, having a predetermined width, is arranged to be moved laterally between the end faces of the pins to be weld united, and relative movement of the chucks is provided to abut the two pins to be weld united against this gauge. Preferably, the faces to be weld united are crowned, such as rounded, conical or frusto-conical.

After the preliminary positioning of the parts against the gauge, the latter is retracted and an inductor is extended between the parts and energized to inductively heat the end faces to be weld united. Following this induction heating, the parts to be weld united are quickly brought into engagement under pressure.

For this purpose, a quick acting device is provided which has a stroke, axially of the parts, which is constant but is less than the width of the gauge by the thermal elongation of the two parts effected by induction preheating. This quick acting device moves the parts into engagement with each other, and they are thereafter resistance welded, under pressure, with the application of resistance welding current thereto. The quick acting device operates independently of a slide drive which is normally provided for moving the two chuck parts toward each other at a relatively slow rate, and may, for example, be operable to move the slide means bodily in a direction to bring the two parts to be welded into engagement.

For an understanding of the principles of the invention, reference is made to the following description of a typical embodiment thereof as illustrated in the accompanying drawing in which the single figure is a somewhat schematic representation of welding apparatus embodying the invention.

Referring to the drawing, the apparatus of the invention is illustrated as used for the weld uniting of two crank shaft parts, or partial crank shafts, each comprising a web having a pair of half length pins, one projecting from each side surface thereof. One crank shaft part 1 is clamped, in a known manner, in a semi-cylindrical bearing member 2 of the left, and preferably fixed, part of the flash welding machine. The other crank part 3 is clamped, likewise in a known manner, in the movable part of the flash welding machine, as by means of being clamped in a chuck 4. The two parts are so supported that their pins 1b and 3b are in axial alignment with each other.

The apparatus includes a retractable gauge 5 having a width, considered axially of the welding apparatus, of $H+X$, which dimensions are defined hereinafter. In advance of welding, this laterally retractable gauge 5 is positioned between the pins 1b and 3b and chuck 4 is moved to the left so that the pins are firmly engaged with gauge 5. Thereby, the exact spacing of the pins 1b and 3b is determined.

Gauge 5 is then retracted laterally and a medium frequency inductor 6 is advanced into the space between the pins 1b and 3b to heat the same by induction heating. A quick acting device is provided, including a piston 7 which is movable in a cylinder 8 by exactly the distance H. Instead of the cylinder and piston, a toggle lever arrangement or other type of drive, which has an exactly predetermined stroke H, may be provided. The conventional relatively slow acting slide drive of the machine is illustrated at 9, and the apparatus includes current supplying jaws 10 which are connected, in a known manner, to a transformer which is not illustrated, and which jaws may be actuated by means of pressure fluid actuators 11.

As indicated at 12, 13, 14 and 15, suitable clamping elements are provided which may either be hydraulically actuated, by hydraulic actuators, or which may be mechanically actuated, as by means of rotatable spindles. Clamping elements 12 and 13 are operatively associated with the fixed part of the welding machine, whereas clamping elements 14 and 15 are operatively associated with the moving part of the welding machine. These clamping elements drive respective clamping jaws 16, 17, 18 and 19. The forward part of the chuck 4, in which the half pin 3a of the crank portion 3 is mounted, can be angularly adjusted about the axis of the apparatus, such angular adjustment being effected, for example, by a drive comprising a worm (not shown) engaged with a worm gear 20 and driven by a motor 21.

In performing the method of the invention, the illustrated apparatus operates as follows: After parts 1 and 3, which are to be weld united with each other, are clamped in their respective holding devices 2 and 4, and after the current conducting jaws 10 have been engaged with the pins 1b and 3b, the exact distance and the exact positions of the parts are set by known fine adjustment means, which have not been illustrated as they form no part of present invention. Gauge 5 is then extended laterally between the pins 1b and 3b and the parts are moved toward each other until the pins 1b and 3b are engaged with the gauge 5. This spaces the pin end surfaces by the exact distance $H+X$, where X is the sum of the thermal elongations of pins 1b and 3b due to induction preheating.

The latter is then withdrawn and inductor 6 is advanced laterally into the gap between the two pins 1b and 3b. Inductor 6 is connected to a source of alternating current of medium frequency, and the end faces of half pins 1b and 3b are inductively preheated. After this heating has been effected for a predetermined time sufficient to obtain the desired temperature and the desired heat content, inductor 6 is withdrawn laterally, this withdrawal automatically effecting disconnection of the source of potential from the inductor. At exactly this time, cylinder 8 has pressure medium admitted to the right-hand end thereof to move piston 7 to the left. This action moves slide 9 and chuck 4 rapidly to the left by the exact distance H. Concurrently with actuation of piston 7, the welding transformer is effectively connected to current conducting jaws 10 so that these jaws have the welding voltage supplied thereto. When the welding gap is closed, by interengagement of the crowned end surfaces of the half pins 1b and 3b, drive 9 is started to move chuck 4 toward holding device 2 at a selected slow rate in accordance with the formation of the weld, and the electric resistance flash welding process is started.

It is necessary that once the electric resistance flash welding process has started, it be carried out without interruption. While conventional machines are provided with known devices which operate when the part accidentally gets "stuck," that is, during an interruption of the resistance welding process, such an arrangement cannot be used with the present invention. With the present invention, if a part gets "stuck," the current intensity of the machine increases to an extent such that the current density in the jaws 10, which are very narrow because of the short lengths or half pins 1b and 3b, would attain an unacceptable high value. This would lead to burnt spots on the workpieces, causing waste.

To make certain that the resistance welding occurs immediately upon closure of the welding gap in order to prevent undesired cooling of the preheated workpieces and to avoid, on the other hand, "sticking" of the parts to be welded with each other, the invention method involves taking several measures as indicated in the following. The width $H+X$ of the gauge 5 is equal to the stroke of the piston 7 plus an amount X which corresponds to the sum of the axial elongations of workpieces 1 and 3 due to preheating by inductor 6. If this preheating were not taken into consideration, there would certainly be sticking of the parts during closing of the welding gap, and even local welding, due to buckling, which would render the parts useless. Furthermore, to insure an immediate and uninterrupted resistance welding process, the end faces of the pins 1b and 3b to be welded are convexly crowned, or are formed as cones, or truncated cones. The continuous application of the two measures just described assures attainment of the desired effect of an intermediate welding without sticking, after which upsetting may be effected in a known manner.

In the drawing, the apparatus is illustrated with the chucking or mounting of the parts taking place with the piston 7 retracted to the right. Of course, it is possible to mount the parts with the piston 7 moved to the left. After the gauging, piston 7 can be retracted to the right to introduce the inductor 6. In this latter case, the width of gauge 5 is reduced to the value X corresponding to the sum of the thermal extensions of the workpieces during preheating by inductor 6.

While specific embodiments of the invention have been shown and/or described in detail to illustrate the application of the principles of the invention, it will be understood that the invention may be embodied otherwise without departing from such principles.

What is claimed is:

1. In a method of electric resistance flash weld uniting two parts, each consisting of a crank web and a pair of half-length pins projecting therefrom, and in which the two parts are clamped, current is supplied to the two parts independently of the clamping thereof, a gauge is moved between the two parts, in advance of resistance weld uniting thereof, for abutment by facing and coaxially aligned half-length pins to set the initial separation of the pins, the gauge is retracted from between the parts, the parts are preheated by an inductor moved therebetween and retracted from between the two parts after preheating, and the parts are then engaged by operation of a quick acting device having a fixed length of stroke and operating independently of a slide drive for the clamping operation, after which the two parts are pressed further together to form an electric resistance weld with application of current to the two parts: the improvement in which the width $(H+X)$ of the gauge is greater by an amount (X) predetermined by the elongation of the two parts due to the preheating, than the length (H) of the fixed stroke of the quick acting device.

2. In electric resistance flash welding apparatus for weld uniting two parts, each consisting of a crank web and a pair of half-length pins projecting therefrom, and of the type including clamping means for the two parts, current supply means for the two parts independent of the clamping means, a slide drive for moving one clamping means relative to the other clamping means, a gauge movable between the two parts for abutment by facing and coaxially aligned half-length pins to set the initial separation of the pins, the gauge being retractable from between the parts, a preheating inductor movable between the half-length pins to preheat the same and retractable from between the parts, and quick acting device, having a fixed length of stroke, for relatively moving the clamping means to engage the half-length pins after induction preheating, the quick acting device operating on the clamping means independently of the slide drive proper: the improvement in which the width $(H+X)$ of said gauge is greater, by an amount (X) determined by the elongation of the two parts due to the preheating, than the length (H) of the fixed stroke of said quick acting device.

References Cited

UNITED STATES PATENTS

| | | | |
|---|---|---|---|
| 1,004,795 | 10/1911 | Lachman | 219—105 |
| 2,332,581 | 10/1943 | Kohler | 219—57 |
| 2,480,863 | 9/1949 | Kerr et al. | 219—101 |
| 2,737,566 | 3/1956 | Wuppermann | 219—100 |
| 3,080,471 | 3/1963 | Rietsch | 219—158 |

RICHARD M. WOOD, *Primary Examiner.*

C. CHADD, *Assistant Examiner.*